United States Patent
Oki et al.

(10) Patent No.: US 10,774,230 B2
(45) Date of Patent: Sep. 15, 2020

(54) INK JET TEXTILE PRINTING INK AND INK JET TEXTILE PRINTING INK SET

(71) Applicant: Seiko Epson Corporation, Tokyo (JP)

(72) Inventors: Yasuhiro Oki, Matsumoto (JP); Hidehiko Komatsu, Chino (JP); Daisuke Sakuma, Minowa (JP); Hiroyuki Kaneko, Minamiminowa (JP)

(73) Assignee: Seiko Epson Corporation (JP)

( * ) Notice: Subject to any disclaimer, the term of this patent is extended or adjusted under 35 U.S.C. 154(b) by 136 days.

(21) Appl. No.: 16/048,751

(22) Filed: Jul. 30, 2018

(65) Prior Publication Data
US 2019/0031899 A1    Jan. 31, 2019

(30) Foreign Application Priority Data

Jul. 31, 2017  (JP) ................................ 2017-147787
May 28, 2018  (JP) ................................ 2018-101298

(51) Int. Cl.
| C09D 11/328 | (2014.01) |
| C09D 11/54 | (2014.01) |
| C09D 11/38 | (2014.01) |
| C09D 11/40 | (2014.01) |
| D06P 1/14 | (2006.01) |
| D06P 1/38 | (2006.01) |
| D06P 1/39 | (2006.01) |
| D06P 1/62 | (2006.01) |
| D06P 1/651 | (2006.01) |
| D06P 5/30 | (2006.01) |

(52) U.S. Cl.
CPC ............ *C09D 11/328* (2013.01); *C09D 11/54* (2013.01); *D06P 1/14* (2013.01); *D06P 1/38* (2013.01); *D06P 1/39* (2013.01); *D06P 1/625* (2013.01); *D06P 1/65118* (2013.01); *D06P 1/65131* (2013.01); *D06P 5/30* (2013.01)

(58) Field of Classification Search
None
See application file for complete search history.

(56) References Cited

U.S. PATENT DOCUMENTS

| 4,702,742 A | * | 10/1987 | Iwata | ...................... D06P 5/001 |
| | | | | 106/31.27 |
| 4,969,951 A | * | 11/1990 | Koike | ...................... C09B 62/00 |
| | | | | 106/31.27 |
| 6,114,411 A | * | 9/2000 | Nakamura | ........... C09D 11/322 |
| | | | | 523/161 |
| 6,371,610 B1 | * | 4/2002 | Nakamura | ................. B41J 2/01 |
| | | | | 347/100 |
| 6,436,180 B1 | * | 8/2002 | Ma | ......................... C09D 11/38 |
| | | | | 106/31.43 |
| 6,447,592 B1 | * | 9/2002 | Taniguchi | ................. D06P 1/39 |
| | | | | 106/31.43 |
| 6,673,140 B2 | * | 1/2004 | Tyrell | ................... C09D 11/328 |
| | | | | 106/31.5 |
| 6,723,835 B1 | | 4/2004 | Millard et al. | |
| 7,303,616 B2 | * | 12/2007 | Oki | ...................... C09D 11/328 |
| | | | | 106/31.49 |
| 2005/0022695 A1 | * | 2/2005 | Yokoyama | ............. C09D 11/32 |
| | | | | 106/31.28 |
| 2011/0007110 A1 | * | 1/2011 | Shimizu | ............... C09D 11/328 |
| | | | | 347/20 |

FOREIGN PATENT DOCUMENTS

| CN | 101134861 A | * | 3/2008 | |
| JP | 63/168477 A | * | 7/1988 | ......... C09B 67/0073 |
| JP | 06/184481 A | * | 7/1994 | |
| JP | 11/302582 A | * | 11/1999 | |
| JP | 2004/155869 A | * | 6/2004 | |
| JP | 2008/231341 A | * | 10/2008 | |
| JP | 2017-110095 A | | 6/2017 | |
| WO | WO-2011-013503 A1 | | 2/2011 | |

OTHER PUBLICATIONS

English translation of JP 11/302582 Nov. 1999; 19 pages.*
English translation of JP 06/184481 Jul. 1994; 9 pages.*
English translation of JP 63/168774 Jul. 1988; 10 pages.*
English translation of CN 101134861 Mar. 2008; 12 pages.*
English translation of JP 2008/231341 Oct. 2008; 13 pages.*
English translation of JP 2004/155869 Jun. 2004; 13 pages.*
Extended European Search Report for EP Application No. 18186124.6, dated Nov. 30, 2018; (5 pages).

* cited by examiner

*Primary Examiner* — Helene Klemanski
(74) *Attorney, Agent, or Firm* — Harness, Dickey & Pierce, P.L.C.

(57) ABSTRACT

An ink jet textile printing ink contains at least one water-soluble dye selected from the group consisting of acid dyes, reactive dyes, and direct dyes, a nonionic surfactant with a content in the range of 0.05% by mass to 3.0% by mass relative to the total mass of the ink, and an anionic surfactant with a content in the range of 1 ppm by mass to 100 ppm by mass relative to the total mass of the ink.

8 Claims, No Drawings

INK JET TEXTILE PRINTING INK AND INK JET TEXTILE PRINTING INK SET

BACKGROUND

1. Technical Field

The present invention relates to an ink jet textile printing ink and an ink jet textile printing ink set.

2. Related Art

An ink jet printing method is a technique for printing performed by ejecting ink droplets through very thin nozzles to apply the ink droplets onto a printing medium. This method enables high-speed printing of a high-definition, high-quality image pattern with a relatively inexpensive apparatus. The ink jet printing method has been improved in terms of a variety of points, such as ink properties, printing stability, quality of the printed pattern. Also, researches on ink jet ink as well as on the apparatus for ink jet printing have been intensively conducted.

The ink jet printing method is applied to dyeing cloth or the like (textile printing). While textile printing on cloth (fabric and nonwoven fabric) is generally performed by screen printing, roller printing, or the like, ink jet printing methods for textile printing have been devised because the ink jet printing method is advantageous in terms of low-volume high-variety production and immediate printing.

Ink jet textile printing inks used for ink jet textile printing have also been studied in terms of, for example, color to be developed, productivity, compatibility with the cloth to be printed, and the like, and some compositions have been devised as ink jet textile printing inks from these viewpoints. For example, International Publication No. WO2011/013503 discloses an ink composition containing a reactive dye, a compound formed by adding ethylene oxide and/or propylene oxide to diglycerin, a nonionic surfactant, an anionic surfactant, and water. According to this prior art document, this composition can be stably ejected continuously from a printer provided with an industrial ink jet head driven at a high frequency under both environments of room temperature and a low temperature irrespective of temperature changes and can be favorably used for dyeing cellulose fabrics and polyimide fabrics.

It is desired that ink jet ink hardly bubble or foam, and that the foam, if occur, be rapidly removed (that is, antifoaming ink jet ink is desirable). From the viewpoint of imparting these characteristics to ink jet ink, a compound capable of functioning to activate surfaces may be added to the ink jet ink. The surface-activating compound is used for adjusting a variety of properties of the ink, such as hydrophilicity, hydrophobicity, antifoaming action, and wettability. It is studied what type of surface-activating compound is suitable and how much the surface-activating compound is added.

Furthermore, from the viewpoint of ensuring stable ejection of ink, it is desired that ink jet ink be able to fill the flow channel of the ejection head of ink jet apparatuses without forming air bubbles (this characteristic is herein referred to as filling property), and that air bubbles, if formed in the ejection head, be able to be rapidly removed or eliminated (this characteristic is herein referred to as air bubble removal). Air bubble removal is also referred to as bubble discharging capability. For example, in the above-cited International Publication No. WO2011/013503, the continuous ejection stability of the ink is attempted to be improved by adding a composition having a specific molecular structure, a nonionic surfactant, and an anionic surfactant to the ink.

Unfortunately, even if some desired properties of an ink are satisfied under a certain condition by adding a specific surfactant in a specific proportion to the ink, the properties are often unsatisfactory under another condition. In addition, these properties are correlative to each other. A lot of studies are desired for an ink jet ink that can exhibiting totally satisfactory properties under various conditions, and it is difficult to achieve such an ink jet ink by a simple approach.

For example, even though the ejection stability of an ink jet ink can be improved by the technique disclosed in the above-cited International Publication No. WO2011/013503, a fear occurs that the anionic surfactant with a high content causes air bubbles to occur and makes the ink non-antifoaming. Furthermore, it is desirable that ink jet textile printing inks be designed in view of the penetration of the ink applied onto the cloth into the cloth and the spreading or wetting of the ink in horizontal directions. In this case as well, it is desirable to study further carefully what type of surfactant is used and how much the surfactant is added.

Moreover, it is desired that ink jet textile printing inks be able to be stably ejected from the ejection head and to produce high-quality dyed image or pattern, in addition to being capable of favorably dyeing cloth.

The present inventors have found through their studies for an ink jet textile printing ink that ink jet textile printing inks containing a water-soluble dye tend to exhibit relatively high color development or the like but poor ejection stability, and that this tendency relates to easy removal of air bubbles from the ink flow channel and filling of the ink flow channel. Also, it has been found that ink jet textile printing inks containing a water-soluble dye are likely to spread over a wider area and tend to cause bleeding in the printed image or pattern.

SUMMARY

An advantage of some aspects of the invention is that it provides an ink jet textile printing ink containing a water-soluble dye that can satisfactorily fill the ink flow channel and can be stably ejected while exhibiting easy removal of air bubbles. Another advantage of some aspects of the invention is that it provides an ink jet textile printing ink set including the ink jet textile printing ink and enabling satisfactory filling of the ink flow channel, stable ejection, easy removal of air bubbles, and production of printed textile with reduced bleeding.

The subject matter disclosed herein is intended to solve at least one of the issues described above and is implemented as the following embodiments.

According to an aspect of the invention, there is provided an ink jet textile printing ink containing at least one water-soluble dye selected from the group consisting of acid dyes, reactive dyes, and direct dyes, a nonionic surfactant with a content in the range of 0.05% by mass to 3.0% by mass relative to the total mass of the ink, and an anionic surfactant in the range of 1 ppm by mass to 100 ppm by mass relative to the total mass of the ink.

In this ink jet textile printing ink, the anionic surfactant with a specific content helps the ink to fill the ink flow channel and facilitates stable ejection of the ink and removal of air bubbles. Thus, the ink jet textile printing ink enables satisfactory textile printing. Also, the concentrations of the nonionic surfactant and the anionic surfactant are appropriately balanced with each other. These surfactants with appropriately balanced concentrations function to reduce the foaming or bubbling of the ink and help the ink to penetrate the material to be printed. In addition, the use of the water-soluble dye ensures satisfactory textile printing.

The water-soluble dye in the ink jet textile printing ink may be one selected from the group consisting of RBk 39, RY 95, RBk 5, ABk 172, AY 79, DB 87, AR 138, and AV 97.

Such an ink jet textile printing ink ensures denser textile printing than previously thought.

The anionic surfactant may be an aromatic sulfonic acid having an alkyl group or a salt thereof.

Such an ink jet textile printing ink can penetrate cloth deeply and is accordingly not likely to spread easily in the horizontal directions of the cloth, thus reducing bleeding.

The aromatic sulfonic acid compound or the salt thereof may be one selected from the group consisting of dodecyl diphenyl ether disulfonic acid and salts thereof and dodecylbenzene sulfonic acid and salts thereof.

Such an ink jet textile printing ink can penetrate cloth deeply and is accordingly not likely to spread horizontally over the cloth, thus reducing bleeding.

The nonionic surfactant may be an acetylene glycol-based surfactant.

In this ink jet textile printing ink, the anionic surfactant and the nonionic surfactant can function with a good balance, further helping the ink to fill the ink flow channel and penetrate the material to be printed.

According to another aspect of the invention, there is provided an ink jet textile printing ink set including at least two inks including the above-described ink jet textile printing ink.

Since the ink jet textile printing ink set includes the above-described ink jet textile printing ink, at least the above-described ink jet textile printing ink can satisfactorily fill the ink flow channel and can be stably ejected while exhibiting easy removal of air bubbles. Thus, the ink set enables satisfactory textile printing. The above-described ink jet textile printing ink can satisfactorily penetrate the material to be printed, and accordingly, the use of this ink reduces bleeding in the printed pattern or image.

In the description described herein, RBk 39, RY 95, RBk 5, ABk 172, AY 79, DB 87, AR 138, and AV 97 refer to C.I. Reactive Black 39, C.I. Reactive Yellow 95, C.I. Reactive Black 5, C.I. Acid Black 172, C.I. Acid Yellow 79, C.I. Direct Blue 87, C.I. Acid Red 138, and C.I. Acid Violet 97, respectively.

DESCRIPTION OF EXEMPLARY EMBODIMENTS

Some embodiments of the invention will now be described. The following embodiments will be described by way of example. The invention is not limited to the following embodiments, and various modifications may be made within the scope and spirit of the invention. All the components disclosed in the following embodiments are not necessarily required for the invention.

1. Ink Jet Textile Printing Ink

The ink jet textile printing ink disclosed herein (hereinafter also simply referred to as the ink) is used by being applied onto cloth by an ink jet method. The ink jet textile printing ink will now be described.

The ink jet textile printing ink according to an embodiment of the invention contains at least one water-soluble dye selected from the group consisting of acid dyes, reactive dyes, and direct dyes, a nonionic surfactant, and an anionic surfactant.

1. 1. Water-Soluble Dye

The ink jet textile printing ink according to the present embodiment contains at least one water-soluble dye selected from the group consisting of acid dyes, reactive dyes, and direct dyes. The water-soluble dye used herein can dye cloth (textile fabrics), and it is not particularly limited how the dye dyes cloth. The water-soluble dye may be composed of a single component or may be a mixture of two or more dyes.

Exemplary acid dyes include C.I. Acid Reds 1, 6, 8, 9, 13, 14, 18, 19, 24, 26, 27, 28, 32, 35, 37, 42, 51, 52, 57, 62, 75, 77, 80, 82, 83, 85, 87, 88, 89, 92, 94, 95, 97, 106, 111, 114, 115, 117, 118, 119, 127, 128, 129, 130, 131, 133, 134, 138, 143, 145, 149, 151, 154, 155, 158, 168, 180, 183, 184, 186, 194, 198, 199, 209, 211, 215, 216, 217, 219, 249, 252, 254, 256, 257, 260, 261, 262, 263, 265, 266, 274, 276, 282, 283, 289, 299, 301, 303, 305, 315, 318, 320, 321, 322, 336, 337, 361, 396, and 397; C.I. Acid Violets 5, 7, 11, 15, 31, 34, 35, 41, 43, 47, 48, 49, 51, 54, 66, 68, 75, 78, 90, 97, 103, 106, and 126; C.I. Acid Yellow 1, 3, 7, 11, 17, 19, 23, 25, 29, 36, 38, 39, 40, 42, 44, 49, 50, 59, 61, 64, 70, 72, 75, 76, 78, 79, 98, 99, 110, 111, 112, 114, 116, 118, 119, 127, 128, 131, 135, 141, 142, 143, 151, 159, 161, 162, 163, 164, 165, 169, 174, 184, 190, 195, 196, 197, 199, 207, 218, 219, 222, 227, and 246; C.I. Acid Blue 1, 7, 9, 15, 22, 23, 25, 27, 29, 40, 41, 43, 45, 49, 54, 59, 60, 62, 72, 74, 76, 78, 80, 82, 83, 87, 90, 92, 93, 100, 102, 103, 104, 106, 112, 113, 114, 117, 120, 126, 127, 127:1, 128, 129, 130, 131, 133, 138, 140, 142, 143, 151, 154, 156, 158, 161, 166, 167, 168, 170, 171, 175, 181, 182, 183, 184, 185, 187, 192, 193, 201, 203, 204, 205, 207, 209, 220, 221, 224, 225, 229, 230, 232, 239, 247, 249, 258, 260, 264, 271, 277, 277:1, 278, 279, 280, 284, 288, 290, 296, 298, 300, 317, 324, 326, 333, 335, 338, 342, and 350; C.I. Acid Black 1, 2, 7, 24, 26, 29, 31, 44, 48, 50, 51, 52, 52:1, 58, 60, 62, 63, 64, 67, 72, 76, 77, 94, 107, 108, 109, 110, 112, 115, 118, 119, 121, 122, 131, 132, 139, 140, 155, 156, 157, 158, 159, 172, 191, 194, and 234; C.I. Acid Orange 1, 7, 8, 10, 19, 20, 24, 28, 33, 41, 43, 45, 51, 56, 63, 64, 65, 67, 74, 80, 82, 85, 86, 87, 88, 94, 95, 122, 123, and 124; C.I. Acid Green 3, 7, 9, 12, 16, 19, 20, 25, 27, 28, 35, 36, 40, 41, 43, 44, 48, 56, 57, 60, 61, 65, 73, 75, 76, 78, and 79; and C.I. Acid Brown 2, 4, 13, 14, 19, 20, 27, 28, 30, 31, 39, 44, 45, 46, 48, 53, 100, 101, 103, 104, 106, 160, 161, 165, 188, 224, 225, 226, 231, 232, 236, 247, 256, 257, 266, 268, 276, 277, 282, 289, 294, 295, 296, 297, 298, 299, 300, 301, and 302.

Exemplary direct dyes include C.I. Direct Reds 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247; C.I. Direct Violets 7, 9, 47, 48, 51, 66, 90, 93, 94, 95, 98, 100, and 101; C.I. Direct Yellows 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163; C.I. Direct Blues 1, 10, 15, 22, 25, 41, 55, 67, 68, 71, 76, 77, 78, 80, 84, 86, 87, 90, 98, 106, 108, 109, 120, 151, 156, 158, 159, 160, 153, 168, 189, 192, 193, 194, 199, 200, 201, 202, 203, 207, 211, 213, 214, 218, 225, 226, 229, 236, 237, 244, 248, 249, 251, 252, 264, 270, 280, 288, 289, and 291; and C.I. Direct Blacks 9, 17, 19, 22, 32, 51, 56, 62, 69, 77, 80, 91, 94, 97, 108, 112, 113, 114, 117, 118, 121, 122, 125, 132, 146, 154, 166, 168, 173, 195, and 199.

Exemplary reactive dyes include C.I. Reactive Yellows 1, 2, 3, 5, 11, 13, 14, 15, 17, 18, 20, 21, 22, 23, 24, 25, 26, 27, 29, 35, 37, 40, 41, 42, 47, 51, 55, 65, 67, 81, 95, 116, 142, and 161; C.I. Reactive Reds 1, 3, 3:1, 4, 13, 14, 17, 19, 21, 22, 23, 24, 24:1, 25, 26, 29, 31, 32, 35, 37, 40, 41, 43, 44, 45, 46, 49, 55, 60, 66, 74, 79, 96, 97, 108, 141, 180, 218, 226, and 245; C.I. Reactive Violets 1, 3, 4, 5, 6, 7, 8, 9, 16, 17, 22, 23, 24, 26, 27, 33, and 34; C.I. Reactive Blue 1, 2, 3, 5, 7, 8, 10, 13, 14, 15, 17, 18, 19, 21, 23, 25, 26, 27, 28, 29, 32, 35, 38, 41, 49, 63, 72, 75, 80, 95, and 190; and C.I. Reactive Blacks 1, 3, 4, 5, 7, 8, 11, 12, 14, 17, 21, 23, 26, 31, 32, 34, and 39.

The water-soluble dye content in total may be in the range of about 0.1% by mass to 30% by mass relative to the total mass of the ink jet textile printing ink and is preferably in the range of 0.5% by mass to 25% by mass, more perfervidly 1% by mass to 20% by mass, still more preferably 3% by mass to 20% by mass.

When the water-soluble dye used in the ink jet textile printing ink of the present embodiment is at least one dye selected from the group consisting of acid dyes, reactive dyes, and direct dyes, cloth can be densely dyed with the ink jet textile printing ink.

More preferably, the water-soluble dye used in the ink jet textile printing ink of the present embodiment is at least one selected from the group consisting of RBk 39 (C.I. Reactive Black 39), RY 95 (C.I. Reactive Yellow 95), RBk 5 (C.I. Reactive Black 5), ABk 172 (C.I. Acid Black 172), AY (C.I. Acid Yellow 79), DB 87 (C.I. Direct Blue 87), AR 138 (C.I. Acid Red 138), and AV 97 (C.I. Acid Violet 97).

When the ink jet textile printing ink of the present embodiment contains any of these dyes, the resulting printed cloth can exhibit much satisfactorily result.

1. 2. Nonionic Surfactant

The ink jet textile printing ink of the present embodiment contains a nonionic surfactant. The nonionic surfactant may be an acetylene glycol-based surfactant, a silicone surfactant, or a fluorosurfactant.

Examples of the acetylene glycol-based surfactant include, but are not limited to, Surfynol series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (each produced by Air Products and Chemicals, Inc.); Olfine series B, Y, P, A, STG, SPC, E1004, E1010, PD-001, PD-002W, PD-003, PD-004, PD-005, EXP. 4001, EXP. 4036, EXP. 4051, AF-103, AF-104, AK-02, SK-14, and AE-3 (each produced by Nissin Chemical Industry); and Acetylenol series E00, E00P, E40, and E100 (each produced by Kawaken Fine Chemicals).

The silicone surfactant used herein may be, but is not limited to, a polysiloxane-based compound. For example, a polyether-modified organosiloxane may be used as the polysiloxane-based compound. The polyether-modified organosiloxane is commercially available, and examples thereof include BYK-306, BYK-307, BYK-333, BYK-341, BYK-345, BYK-346, and BYK-348 (each produced by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each produced by Shin-Etsu Chemical).

The fluorosurfactant may be a fluorine-modified polymer, such as BYK-340 (produced by BYK).

The nonionic surfactant may be selected from among polyethylene glycol-based esters, polyethylene glycol-based ethers, polyethylene glycol-based amines, polyethylene glycol-based amides, and polyhydric alcohol fatty acid (partial) esters. Examples of such a nonionic surfactant include polypropylene glycol ethylene oxide adducts, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, fatty acid alkanol amides, glycerol esters, and sorbitan esters. These nonionic surfactants are commercially available, and examples thereof include DISPERNOL TOC (produced by NOF Corporation), AQUARON HS-10 and AQUARON KH-05 (each produced by Dai-ichi Kogyo Seiyaku), and Newcol 2308LY (produced by Nippon Nyukazai).

The above-cited nonionic surfactants may be used singly or in combination. The nonionic surfactant content in total is in the range of 0.05% by mass to 3% by mass relative to the total mass of the ink jet textile printing ink. For example, the nonionic surfactant content may be in the range of 0.05% by mass to 2.5% by mass and is preferably in the range of 0.1% by mass to 2% by mass, more preferably 0.2% by mass to 1.5% by mass.

In an embodiment of the ink jet textile printing ink, the nonionic surfactant may be an acetylene glycol-based surfactant. The action of the acetylene glycol-based surfactant has a good balance with the action of the anionic surfactant that will be described herein later; hence, the acetylene glycol-based surfactant is compatible with the anionic surfactant. Accordingly, the use of an acetylene glycol-based surfactant further helps the ink to fill the ink flow channel and to penetrate the cloth to be printed.

The ink jet textile printing ink can be stably ejected from a printing head because of the presence of the nonionic surfactant. Also, when the nonionic surfactant content is appropriate, the penetration of the ink may be enhanced, so that the ink can easily come into contact with the pretreating composition if a pretreating composition is used.

1. 3. Anionic Surfactant

The ink jet textile printing ink of the present embodiment contains an anionic surfactant. Any anionic surfactant may be uses without particular limitation, and an example of the anionic surfactant may be a compound having a hydrophilic group derived from a carboxylic compound, a sulfonic compound, a sulfuric ester, a phosphoric ester, or the like and a hydrophobic group derived from an aliphatic compound, an aromatic compound, or the like.

Examples of the anionic surfactant include alkylbenzene sulfonic acids and salts thereof, such as sodium dodecylbenzenesulfonate; dialkylsulfosuccinic acids and salts thereof, such as sodium diethylhexylsulfosuccinate and sodium diisotridecylsulfosuccinate; di(polyoxyethylene alkyl ether)sulfosuccinic acids and salts thereof, such as sodium di(polyoxyethylene 2-ethylhexyl ether)sulfosuccinate and sodium di(polyoxyethylene isotridecyl ether)sulfosuccinate; polyoxyalkylene alkyl ether sulfuric acids and salts thereof, such as sodium polyoxyethylene lauryl ether sulfate and sodium polyoxyethylene myristyl ether sulfate; polyoxyethylene alkyl ether sulfates, such as sodium polyoxyethylene alkyl ether sulfates and ammonium polyoxyethylene alkyl ether sulfates; polyoxyethylene alkylphenyl ether sulfates, such as sodium polyoxyethylene alkylphenyl ether sulfates and ammonium polyoxyethylene alkylphenyl ether sulfates; polyoxyethylene polycyclic phenyl ether sulfates, such as sodium polyoxyethylene polycyclic phenyl ether sulfates and ammonium polyoxyethylene polycyclic phenyl ether sulfates; polyoxyethylene-polyoxypropylene glycol ether sulfuric acid and salts thereof; alkyl sulfuric acids and salts thereof, such as sodium lauryl sulfate, sodium higher alcohol sulfates, triethanol amine lauryl sulfate, and ammonium lauryl sulfate; fatty acids and salts thereof, such as potassium oleate, sodium oleate, and semi-hardened tallow fatty acid sodium salt; alkyl diphenyl ether disulfonic acids and salts thereof, such as diammonium dodecyl diphenyl ether disulfonate, sodium dodecyl diphenyl ether disulfonate, potassium dodecyl diphenyl ether disulfonate, and sodium alkyl diphenyl ether disulfonates; salts of condensates of an aromatic sulfonic acid and formaldehyde, such as sodium salt of naphthalene sulfonic acid formalin condensate; higher fatty acid amide sulfonic acids and salts thereof, such as sodium lauroyl sarcosinate and other N-sarcosinates, N-myristoyl-N-methyltaurine sodium salt, and sodium coconut oil fatty acid methyl tauride; and N-acylglutamic acids and salts thereof, such as disodium N-stearoylglutamate and monosodium N-stearoylglutamate.

A commercially available anionic surfactant may be used, and examples thereof include Taipol NLT-42, Taipol NLL-27, Taipol NOS-35, and Taipol NOES-340 (each produced by Taiko Oil); Neopelex G-65, Pelex SS-H, and Emal TD (each produced by Kao); Aquaron HS-10 and Aquaron KH-05 (each produced by Dai-ichi Kogyo Seiyaku); and Eleminol MON-2 (produced by produced by Sanyo Chemical Industries).

The above-cited anionic surfactants may be used singly or in combination. The anionic surfactant content in total is in the range of 1 ppm by mass to 100 ppm by mass relative to the total mass of the ink jet textile printing ink. Hence, the anionic surfactant content in total is in the range of 0.0001% by mass to 0.01% by mass relative to the total mass of the ink jet textile printing ink. The unit ppm by mass is the unit of the value obtained by dividing the total mass of the anionic surfactant in the ink by the total mass of the ink jet textile printing ink. More specifically, the anionic surfactant content may be in the range of 3 ppm by mass to 80 ppm by mass and is preferably in the range of 5 ppm by mass to 50 ppm by mass, more preferably 10 ppm by mass to 50 ppm by mass.

Preferably, the anionic surfactant in the ink jet textile printing ink is an aromatic sulfonic acid having an alkyl group or a salt thereof. The use of such an anionic surfactant helps the ink jet textile printing ink to satisfactorily fill the ink flow channel and facilitates the removal of air bubbles. Also, such an anionic surfactant helps the ink jet textile printing ink to penetrate the cloth to be printed and, accordingly, helps suppress the spreading of the ink in the horizontal directions of the cloth, thus preventing, for example, bleeding in the printed pattern.

More preferably, the alkyl group-containing aromatic sulfonic acid or a salt thereof may be at least one selected from the group consisting of dodecyl diphenyl ether disulfonic acid and salts thereof and dodecylbenzene sulfonic acid and salts thereof. The use of such an anionic surfactant further helps the ink jet textile printing ink to fill the ink flow channel satisfactorily and facilitates the removal of air bubbles. Also, such an anionic surfactant helps the ink jet textile printing ink to penetrate the cloth to be printed and, accordingly, helps suppress the spreading of the ink in the horizontal direction of the cloth, thus preventing, for example, bleeding in the printed pattern.

1. 4. Other Ingredients

1. 4. 1. Water

The ink jet textile printing ink according to the present embodiment may contain water. The water may be pure water or ultra-pure water from which ionic impurities have been reduced. Examples of such water include ion exchanged water, ultrafiltered water, reverse osmosis water, and distilled water. Sterile water prepared by, for example, UV irradiation or addition of hydrogen peroxide can prevent the occurrence of bacteria and Eumycota in the ink jet textile printing ink over a long time.

The water content may be 30% by mass or more and is preferably 40% by mass or more, for example, 45% by mass or more or 50% by mass or more, relative to the total mass of the ink jet textile printing ink. The water in the ink jet textile printing ink refers to the sum of the water contained in the ingredients and the water added to the ink. When the water content is 30% by mass or more, the ink jet textile printing ink has a relatively low viscosity. The upper limit of the water content may be 90% by mass or less and is preferably 85% by mass or less, more preferably 80% by mass or less, relative to the total mass of the ink jet textile printing ink.

1. 4. 2. Organic Solvent

The ink jet textile printing ink of the present embodiment may contain an organic solvent, such as a nitrogen-containing organic compound, an alkyl polyol, and a glycol ether.

Nitrogen-Containing Organic Compound

Examples of the nitrogen-containing organic compound include nitrogen-containing heterocyclic compounds, such as ε-caprolactam (136° C.), N-methyl-2-pyrrolidone (204° C.), N-ethyl-2-pyrrolidone (212° C.), N-vinyl-2-pyrrolidone (193° C.), 2-pyrrolidone (245° C.), and 5-methyl-2-pyrrolidone (248° C.), urea, and dimethyl urea. Each value in parentheses represents the normal boiling point of the corresponding compound. These nitrogen-containing organic compounds may be used singly or in combination. The nitrogen-containing compound can easily dissolve the dye and is therefore expected to keep the ink jet textile printing ink from solidifying or drying.

The nitrogen-containing organic compound content in total may be in the range of 1% by mass to 30% by mass and is preferably in the range of 2% by mass to 20% by mass, for example, 3% by mass to 15% by mass or 4% by mass to 10% by mass.

Alkyl Polyol

Examples of the alkyl polyol include 1,2-butanediol (194° C.), 1,2-pentanediol (210° C.), 1,2-hexanediol (224° C.), 1,2-heptanediol (227° C.), 1,3-propanediol (trimethylene glycol, 210° C.), 1,2-propanediol (188° C.), 1,3-butanediol (230° C.), 1,4-butanediol (230° C.), 1,5-pentanediol (242° C.), 1,6-hexanediol (250° C.), 2-ethyl-2-methyl-1,3-propanediol (226° C.), 2-methyl-2-propyl-1,3-propanediol (230° C.), 2-methyl-1,3-propanediol (214° C.), 2,2-dimethyl-1,3-propanediol (210° C.), 3-methyl-1,3-butanediol (203° C.), 2-ethyl-1,3-hexanediol (244° C.), 3-methyl-1,5-pentanediol (250° C.), 2-methylpentane-2,4-diol (197° C.), diethylene glycol (245° C.), dipropylene glycol (232° C.), triethylene glycol (287° C.), and glycerin (290° C.). Each value in parentheses represents the normal boiling point of the corresponding compound. These alkyl polyols may be used singly or in combination.

As long as the alkyl polyol content is 5% by mass or more relative to the total mass of the ink jet textile printing ink, the ink can produce intended effects. For example, the alkyl polyol content may be in the range of 5% by mass to 30% by mass and is preferably in the range of 8% by mass to 27% by mass, for example, 10% by mass to 25% by mass.

Glycol Ether

The glycol ether may be a monoalkyl ether of a glycol selected from the group consisting of ethylene glycol, diethylene glycol, triethylene glycol, polyethylene glycol, propylene glycol, dipropylene glycol, tripropylene glycol, polypropylene glycol, and polyoxyethylene polyoxypropylene glycol. Preferred examples of the glycol ether include methyl triglycol (triethylene glycol monomethyl ether), butyl triglycol (triethylene glycol monobutyl ether), butyl diglycol (diethylene glycol monobutyl ether), and dipropylene glycol monopropyl ether. In some embodiments, diethylene glycol monobutyl ether (230° C.) may be used. The value in the parentheses represents the normal boiling point.

A plurality of glycol ethers may be used in combination. If glycol ether is used, the total content thereof may be in the range of 0.2% by mass to 30% by mass from the viewpoint of easily adjusting the viscosity of the ink jet textile printing ink and imparting moisture retention to the ink to prevent clogging and is preferably in the range of 0.4% by mass to 20% by mass, for example, 1% by mass to 15% by mass or 2% by mass to 10% by mass.

Other Organic Solvent

Other organic solvents may be used in the ink jet textile printing ink of the present embodiment, and examples thereof include lactones, such as γ-butyrolactone, and betaine compounds. These organic solvents may act to control the wettability and the penetration speed of the ink, consequently improving the color development of the printed pattern.

1. 4. 3. Further Surfactant

The ink jet textile printing ink of the present embodiment may further contain a cationic surfactant, an amphoteric surfactant, or the like in addition to the above-described nonionic surfactant and anionic surfactant. One or more of these further surfactants may be added for reducing the surface tension of the ink jet textile printing ink to adjust the wettability on the cloth (or the penetration into the cloth) or may be accessorily used within the range in which the effects of the above-described surfactants can be certainly produced.

1. 4. 4. pH Adjuster

The ink jet textile printing ink of the present embodiment may contain a pH adjuster to control the pH of the ink. The pH adjuster may be, but is not limited to, an appropriate combination of some of acids, bases, weak acids, and weak bases. The acids and bases used for this combination include inorganic acids, such as sulfuric acid, hydrochloric acid, and nitric acid; inorganic bases, such as lithium hydroxide, sodium hydroxide, potassium hydroxide, potassium dihydrogenphosphate, disodium hydrogenphosphate, potassium carbonate, sodium carbonate, sodium hydrogencarbonate, and ammonia; organic bases, such as triethanolamine, diethanolamine, monoethanolamine, tripropanolamine, triisopropanolamine, diisopropanolamine, and tris(hydroxymethyl)aminomethane (THAM); organic acids, such as adipic acid, citric acid, succinic acid, lactic acid. Also, a buffer solution may be used, and examples thereof include Good buffers, such as N,N-bis(2-hydroxyethyl)-2-aminoethanesulfonic acid (BES), 4-(2-hydroxyethyl)-1-piperazine ethanesulfonic acid (HEPES), morpholinoethanesulfonic acid (MES), carbamoylmethyliminodiacetic acid (ADA), piperazine-1,4-bis(2-ethanesulfonic acid) (PIPES), N-(2-acetamido)-2-aminoethanesulfonic acid (ACES), cholamine chloride, N -tris(hydroxymethyl)methyl-2-aminoethanesulfonic acid (TES), acetamidoglycine, tricine, glycinamide, and bicine, phosphate buffers, citrate buffers, and tris buffers. Preferably, the ink jet textile printing ink contains a tertiary amine, such as triethanolamine or triisopropanolamine, and a carboxylic acid, such as adipic acid, citric acid, succinic acid, or lactic acid, in combination as a part or the entirety of the pH adjuster. Such a pH adjuster can function stably as a pH buffer.

The pH adjuster is added into the ink jet textile printing ink while the pH of the ink is being checked. For example, 0.01% by mass to 3% by mass of the pH adjuster may be added relative to the total mass of the ink. In an embodiment, the pH adjuster content may be in the range of 0.1% by mass to 2% by mass or 0.2% by mass to 1% by mass.

1. 4. 5. Urea Compound

The ink jet textile printing ink may also contain a urea compound as a moisturizing agent or a dyeing aid for enhancing the dyeability of the dye. Dyeability is also referred to as dyeing ability. Examples of the urea compound include urea, ethyleneurea, tetramethylurea, thiourea, and 1,3-dimethyl-2-imidazolidinone. If a urea compound s added, the content thereof may be in the range of 1% by mass to 10% by mass relative to the total mass of the ink.

1. 4. 6. Saccharide

From the viewpoint of minimizing the solidification, the drying or the like of the ink jet textile printing ink, a saccharide may be added. Examples of the saccharide include glucose, mannose, fructose, ribose, xylose, arabinose, galactose, aldonic acid, glucitol (sorbitol), maltose, cellobiose, lactose, sucrose, trehalose, and maltotriose.

1. 4. 7. Chelating Agent

From the viewpoint of, for example, removing undesired ions from the ink jet textile printing ink, a chelating agent may be added. Examples of the chelating agent include ethylenediaminetetraacetic acid and salts thereof (such as disodium dihydrogen ethylenediaminetetraacetate), nitrilotriacetic acid and salts thereof, hexametaphosphates, pyrophosphates, and metaphosphates.

1. 4. 8. Preservative or Fungicide

The ink jet textile printing ink may contain a preservative and/or a fungicide, if necessary. Examples of the preservative or the fungicide include sodium benzoate, sodium pentachlorophenol, 2-pyridinethiol 1-oxide sodium salt, sodium sorbate, sodium dehydroacetate, and 1,2-benzisothiazolin-3-one (Proxel CRL, Proxel BDN, Proxel GXL, and Proxel XL. 2, Proxel TN, Proxel LV, each produced by Zeneca), and 4-chloro-3-methylphenol (Preventol CMK produced by Lanxess).

1. 4. 9. Other Ingredients

The ink jet textile printing ink may further contain other ingredients, such as a rust preventive, an antioxidant, a UV absorbent, an oxygen absorbent, a solubilizing agent, and any other additive that is generally used in ink jet inks. Also, the ink jet textile printing ink of the present embodiment may contain another water-soluble dye other than the above-described acid dyes, reactive dyes, and direct dyes.

1. 5. Preparation and Physical Properties of Ink Jet Textile Printing Ink

The ink jet textile printing ink of the present embodiment is prepared by mixing the above-described ingredients in an arbitrary order and, optionally, removing impurities by, for example, filtration. For mixing the ingredients, for example, the ingredients may be added one after another into a container equipped with a stirring device, such as a mechanical stirrer or a magnetic stirrer, and the contents of the container are stirred.

The ink jet textile printing ink of the present embodiment may have a surface tension at 20° C. in the range of 20 mN/m to 40 mN/m from the viewpoint of the balance between the resulting print quality and the reliability of the ink as textile printing ink, and the surface tension is preferably in the range of 22 mN/m to 35 mN/m. Also, from the same viewpoint as above, the viscosity at 20° C. of the ink may be in the range of 1.5 mPa·s to 10 mPa·s and is preferably in the range of 2 mPa·s to 8 mPa·s. For controlling the surface tension and the viscosity in such ranges, the types, contents, and other factors of the organic solvent and the surfactants are appropriately controlled.

1. 6. Material to be Printed

The ink jet textile printing ink of the present embodiment may be used for printing varieties of cloth. Examples of the material of the cloth include, but are not limited to, natural fiber, such as cotton, hemp, ramie, linen, sheep wool, or silk; synthetic fiber, such as polypropylene, polyester, acetate, triacetate, polyamide, or polyurethane; biodegradable fiber, such as poly(lactic acid); and mixed fiber of these fibers. The cloth may be in any form, such as textile fabric, knitting, or nonwoven fabric. Preferably, the cloth to be printed with the ink jet textile printing ink of the present disclosure contains polyamide fibers. The ink jet textile printing ink exhibits good dyeability to such cloth. For printing, the cloth may optionally be pretreated with at least one of an alkali or a hydrotrope. This treatment may increase the dyeability of the dye.

1. 7. Effects

The ink jet textile printing ink contains an anionic surfactant with a specific content. The anionic surfactant helps the ink to fill the ink flow channel of the ink jet apparatus and facilitates stable ejection of the ink and the removal of air bubbles. Thus, the ink jet textile printing ink enables satisfactory textile printing. Also, the concentrations of the nonionic surfactant and the anionic surfactant are appropriately balanced with each other. These surfactants with appropriately balanced concentrations function to reduce the foaming or bubbling of the ink and help the ink to penetrate the material to be printed. In addition, the use of a water-soluble dye helps satisfactory textile printing.

The present inventors have found, through their studies on ink jet textile printing inks, that ink jet textile printing inks containing a water-soluble dye are more likely to spread horizontally on the cloth than to penetrate the cloth and accordingly tend to cause bleeding in the printed image or pattern. The bleeding probably results from the nature of the ink that tends to move along the fibers of the cloth. Although the definite cause of this tendency is not clear, the present inventors assume that the tendency is affected by impurities and the amount thereof and have found that the state of the ink filling the ink flow channel and the difficulty of air bubble removal are factors of the tendency.

From these assumption and findings, it has been found that by adding a specific amount of a nonionic surfactant and a very small specific amount of an anionic surfactant, the ink jet textile printing ink becomes capable of satisfactorily filling the flow channel and facilitating air bubble removal. Thus, the ink jet textile printing ink is disclosed herein. Although the concentration or content of the anionic surfactant in the ink jet textile printing ink disclosed therein is much lower than usual, the Examples described below demonstrate unexpected effects of the presence of the anionic surfactant.

2. Ink Jet Textile Printing Ink Set

The ink jet textile printing ink according to an embodiment of the invention may be combined with one or more ink jet textile printing inks each containing a dye of a desired color, thus constituting an ink set.

For example, the ink jet textile printing ink set according to an embodiment of the invention includes a cyan ink, a magenta ink, a yellow ink, and a black ink. The ink jet textile printing ink set may further include at least one ink selected from among a blue ink, an orange ink, a red ink, and a brown ink. At least one of the inks constituting the ink jet textile printing ink set is the ink jet textile printing ink according to an embodiment of the invention.

As with the above-described ink jet textile printing ink, each ink of the ink set, such as a cyan ink, a magenta ink, a yellow ink, a black ink, a blue ink, an orange ink, a red ink, or a brown ink, contains water, an organic solvent, a surfactant, and other ingredients with a desired proportion.

Since the ink jet textile printing ink set includes the above-described ink jet textile printing ink, the ink set enables satisfactory textile printing in which at least the ink jet textile printing ink disclosed herein can satisfactorily fill the ink flow channel and can be stably ejected while exhibiting easy removal of air bubbles. The ink jet textile printing ink disclosed herein can satisfactorily penetrate the material to be printed, and accordingly, the use of this ink reduces bleeding in the printed pattern or image. In other words, the ink jet textile printing ink set of the present embodiment includes the ink jet textile ink disclosed according to an embodiment of the invention, and this ink easily penetrates the material to be printed in the depth direction of the material and is thus not likely to spread easily in the horizontal directions. Consequently, the ink jet textile printing ink is kept from spreading to another ink deposited adjacent to the ink jet textile printing ink, thus, reducing bleeding in the printed pattern or image.

3. Examples and Comparative Examples

The above-described embodiments of the invention will now be further described in detail with reference to Examples. However, the invention is not limited to the disclosed Examples.

3. 1. Examples and Comparative Examples of Ink Jet Textile Printing Ink

3. 1. 1. Preparation of Ink Jet Textile Printing Inks

The ingredients with the proportions shown in Table 1 were mixed by stirring with a magnetic stirrer for 2 hours, and the mixture was then filtered through a membrane filter of 5 μm in pore size. Thus, each of the ink jet textile printing inks of the Examples and Comparative Examples was prepared. The compositions of the inks include ink that the coloring material (dye) varies among the inks. The unit of each value in Table 1 is shown in the corresponding section.

TABLE 1

|  |  | Example | | | | | | | | | | | Comparative Example | | | | | |
|---|---|---|---|---|---|---|---|---|---|---|---|---|---|---|---|---|---|---|
|  |  | A-1 | A-2 | A-3 | A-4 | A-5 | A-6 | A-7 | A-8 | A-9 | A-10 | A-11 | B-1 | B-2 | B-3 | B-4 | B-5 | B-6 |
| Water-soluble dye (mass %) | Reactive Black 39 | 15 | — | — | — | — | — | — | — | — | — | — | 15 | — | — | — | — | — |
|  | Reactive Yellow 95 | — | 7 | — | — | — | — | — | — | — | — | — | — | 7 | — | — | — | — |
|  | Reactive Black 5 | — | — | 10 | — | — | — | — | — | — | — | — | — | — | 10 | — | — | — |
|  | Acid Black 172 | — | — | — | 10 | — | — | — | 10 | — | — | — | — | — | — | 10 | — | 7 |
|  | Acid Yellow 79 | — | — | — | — | 5 | — | — | — | 10 | 5 | — | — | — | — | — | 5 | 5 |
|  | Acid Red 138 | — | — | — | — | — | 2 | 7 | — | — | — | 7 | — | — | — | — | — | — |
|  | Acid Violet 97 | — | — | — | — | — | 2 | 3 | — | — | — | 2 | — | — | — | — | — | — |
| Nonionic surfactant (mass %) | Direct Blue 87 | — | 1 | 0.2 | 0.05 | — | — | — | 0.2 | 0.1 | — | — | — | — | 0.2 | 0.01 | — | — |
|  | SURFYNOL 465 | 0.1 | — | 0.3 | — | 1 | 0.3 | — | 0.3 | — | 1 | — | 0.1 | — | 0.3 | — | 1 | — |
|  | SURFYNOL 104 |  |  |  |  |  |  |  |  |  |  |  |  |  |  |  |  |  |
| Anionic Surfactant (ppm) | Sodium dodecyl diphenyl ether disulfonate | 10 | — | — | 5 | — | 10 | — | — | 5 | 50 | 10 | — | — | — | 5 | — | 10 |
|  | Sodium dodecylbenzenesulfonate | — | 50 | — | — | — | — | — | 5 | — | — | — | — | 50 | — | — | — | — |
|  | Triethanolamine lauryl sulfate | — | — | — | — | — | — | — | — | — | — | — | — | — | — | — | — | — |
| Organic solvent or the like (mass %) | Glycerin | — | — | 1 | 2 | 100 | 10 | 10 | — | 2 | 10 | 13 | 10 | — | 0.1 | 2 | 200 | 13 |
|  | Propylene glycol | 10 | 5 | 7 | — | 10 | — | 13 | 7 | — | — | — | 5 | 5 | 7 | — | 10 | — |
|  | Triethylene glycol | 5 | — | — | 2 | — | — | 8 | — | 2 | 8 | 8 | 5 | 3 | — | 2 | 8 | 8 |
|  | Diethylene glycol monobutyl ether | 3 | 3 | — | — | 8 | — | 7 | — | 2 | — | 7 | 3 | — | 7 | — | — | 7 |
|  | Triethylene glycol monobutyl ether | — | — | — | 3 | 8 | 10 | — | — | 3 | 8 | — | — | 3 | — | 3 | 8 | — |
|  | 1,2-Hexanediol | — | — | 3 | — | — | — | — | 3 | — | — | — | — | — | 3 | — | — | — |
|  | 2-Pyrrolidon | 5 | 10 | 7 | 15 | — | 10 | — | 7 | 15 | — | — | 5 | 10 | 7 | 15 | — | — |
|  | Urea | 5 | 3 | — | 5 | — | — | — | — | 5 | — | — | 5 | 3 | — | 5 | — | — |
|  | Triethanolamine | — | — | — | 0.5 | 0.5 | 0.5 | 0.5 | — | 0.5 | 0.5 | 0.5 | — | — | — | 0.5 | — | 0.5 |
|  | Tripropanolamine | 0.2 | 0.2 | 0.2 | — | — | — | — | 0.2 | — | — | — | 0.2 | 0.2 | 0.2 | — | — | — |
|  | N,N-bis(2-hydroxyethyl)-2-aminoethane sulfonic acid | — | — | — | — | — | — | — | — | — | — | — | — | — | — | — | — | — |
| Water (mass %) | Ion exchanged water | Balance | Balance | Balance | Balance | Balance | Balance | Balance | Balance | Balance | Balance | Balance | Balance | Balance | Balance | Balance | Balance | Balance |
|  | Total (mass %) | 100 | 100 | 100 | 100 | 100 | 100 | 100 | 100 | 100 | 100 | 100 | 100 | 100 | 100 | 100 | 100 | 100 |
| Evaluation result | Filling property | A | A | C | A | B | A | B | A | A | A | A | E | B | D | B | D | A |
|  | Air bubble removal | A | B | B | B | C | A | B | B | A | A | A | E | C | D | D | D | A |
|  | Ejection stability | A | A | B | B | B | B | B | B | A | A | B | C | D | B | D | B | D |

In Table 1, Surfynol 465 and Surfynol 104 are nonionic surfactant produced by Air Products and Chemicals, Inc.: 2,4,7, 9-tetramethyl-5-decyne-4,7-diol -di(polyoxyethylene) ether; and 2,4,7,9-tetramethyl-5-decyne -4,7-diol, respectively. The anionic surfactants are each a commercially available regent.

3. 1. 2. Evaluation of Ink Jet Textile Printing Inks

Filling Test

Each of the ink jet textile printing inks of the Examples and Comparative Examples was introduced into the flow channel of the head of an ink jet textile printer Monna Lisa 180 T16 (manufactured by Robustelli) from which ink had been removed. Then, the apparatus was subjected to cleaning operation, and the number of times of cleaning operation until the ink that had entered the head was properly ejected through the nozzles. Thus, the filling property of each ink in the head was graded according to the following criteria, and the results are shown in Table 1. Grades A, B, and C according to the following criteria are acceptable levels.

A: Proper ink ejection was recovered by cleaning within 3 times.

B: Proper ink ejection was recovered by 4 or 5 times of cleaning operation.

C: Proper ink ejection was recovered by 6 or 7 times of cleaning operation.

D: 8 or 9 times of cleaning were required for proper ejection.

E: Ink was not properly ejected even by 10 times of cleaning operation.

Air Bubble Removal Test

In a state where the head of an ink jet textile printer Monna Lisa 180 T16 (manufactured by Robustelli) was filled with the ink, the path through which the ink should be fed to the head was sealed so that the ink could not be fed during the cleaning of the apparatus. In this state, the suction cap for cleaning was released so that air flowed backwardly into the head and the flow channel through the nozzles. Then, the path for feeding the ink to the head was opened, and the number of times of cleaning operation until the ink was properly ejected through the nozzles with back-flow air removed. Thus, the air bubble removal from the head was graded according to the following criteria, and the results are shown in Table 1. Grades A, B, and C according to the following criteria are acceptable levels.

A: Proper ink ejection was recovered by cleaning within 3 times.

B: Proper ink ejection was recovered by 4 or 5 times of cleaning operation.

C: Proper ink ejection was recovered by 6 or 7 times of cleaning operation.

D: 8 or 9 times of cleaning were required for proper ejection.

E: Ink was not properly ejected even by 10 times of cleaning operation.

Ejection Stability Test

An ink jet textile printer Monna Lisa 180 T16 (manufactured by Robustelli) was charged with any of the ink jet textile printing inks, and a rolled medium was continuously printed with the ink at 720 dpi×540 dpi in a 3-pass mode. It was checked whether or not the medium was properly printed without missing dots or deviation. The distance to the point of the medium at which dot missing or deviation occurred was graded according to the following criteria, and the results are shown in Table 1. Grades A, B, and C according to the following criteria are acceptable levels.

A: 1000 m or more was properly printed.

B: 500 m to less than 1000 m was properly printed.

C: 200 m to less 500 m was properly printed.

D: Dot missing or deviation occurred at a point of less than 200 m.

3. 2. Examples and Comparative Examples of Ink Jet Textile Printing Ink Sets

3. 2. 1. Ink Jet Textile Printing Ink Sets

Ink jet textile printing ink sets of Examples and Comparative Examples were prepared by combining some of the ink jet textile printing inks of the above-described Examples and Comparative Examples as shown in Table 2. Each ink set included two color inks of an X color and a Y color.

TABLE 2

| | | Ink Set Example | | | | | Ink Set Comparative Example | | |
|---|---|---|---|---|---|---|---|---|---|
| | S1 | S2 | S3 | S4 | S5 | S6 | CS1 | CS2 | C53 |
| X color ink | A-1 | A-2 | A-4 | A-9 | A-5 | A-7 | B-1 | B-4 | B-5 |
| Y color ink | A-2 | A-3 | A-10 | A-11 | A-6 | A-10 | B-2 | B-5 | B-6 |
| Test Pattern A | A | C | A | A | A | B | E | E | F |
| result Pattern B | A | B | A | A | A | C | F | F | D |

3. 2. 2. Procedure for Evaluating Ink Sets Ink Set Examples: S1, S2, and CS1

A cotton cloth with a basis weight of 130 g/m² was immersed in the following pretreating agent and was squeezed to a pickup of 20% with a mangle. Then, the cloth was dried at 60° C. in an oven for 10 minutes to yield a test cloth 1.

Pretreating Agent
  Sodium alginate: 1.0% by mass
  Guar gum: 1.0% by mass
  Ammonium sulfate: 4.0% by mass
  Urea: 10.0% by mass
  Water: balance Subsequently, an ink jet textile printer "Monna-Lisa 180 T16" (manufactured by Robustelli) was charged with the two color inks (X color and Y color) of any one of the ink sets of the Examples so as to fill the yellow line and the cyan line, respectively, and the following patterns were each printed on test cloth 1 at 540 dpi×720 dpi in 3-pass mode.

Pattern A: a 0.5 mm-thick line drawn with the X color and surrounded by the Y color solid area Pattern B: a 0.5 mm-thick line drawn with the Y color and surrounded by the X color solid area After printing, the cloth was treated at 102° C. with steam from a steamer (Steamer DHe manufactured by Mathis) for 12 minutes, followed by washing to remove the dye not fixed to the cloth. The cloth was further washed with an aqueous solution containing 0.2% by mass of a surfactant Laccol STA (produced by Meisei Chemical Works) at 95° C. for 10 minutes and dried at 60° C. in an oven to yield a printed sample.

Ink Set Examples S3, S4, S5, S6, CS2, and CS3

A silk cloth with a basis weight of 60 g/m$^2$ was pretreated in the same manner as above to yield a test cloth 2. Then, test cloth 2 was printed in the same manner as above with the inks of each Ink Set Example.

After printing, the cloth was treated with steam from a steamer DHe at 100° C. for 30 minutes, followed by washing to remove the dye not fixed to the cloth. The cloth was further washed with an aqueous solution containing 0.2% by mass of Laccol STA at 55° C. for 30 minutes and dried at 60° C. in an oven to yield a printed sample.

The printed samples thus prepared were graded according to the following criteria, and the results are shown in Table 2. Grades A, B, and C according to the following criteria are acceptable levels.

A: The thin lines of the printed pattern were sharp, and no bleeding was observed.

B: The thin lines of the printed pattern were slightly swelled, but no bleeding was observed.

C: The thin lines of the printed pattern seemed to be slightly thinner but were seen, and no bleeding was observed.

D: The thin lines of the printed pattern seemed to be swelled.

E: The thin lines of the printed pattern seemed to be swelled, and bleeding was observed.

F: The thin lines of the printed pattern seemed to be thinner or were not seen, due to the solid colors widely spread.

3. 3. Test Results

Table 1 shows that the ink jet textile printing inks of the Examples A-1 to A-11, each of which contained a water-soluble dye, a nonionic surfactant with a content in the range of 0.05% by mass to 3.0% by mass relative to the total mass of the ink, and an anionic surfactant with a content in the range of 1 ppm by mass to 100 ppm by mass relative to the total mass of the ink, satisfactorily filled the flow channel and exhibited good air bubble removal and ejection stability.

On the other hand, the ink of Comparative Example B-1, which did not contain an anionic surfactant, was not able to fill satisfactorily the flow channel and exhibited unsatisfactory air bubble removal. Also, the ink of Comparative Example B-2, which did not contain a nonionic surfactant, was not able to be stably ejected, while the filling and air bubble removal were acceptable.

The ink of Comparative Example B-3, which contained an anionic surfactant as little as 0.1 ppm by mass, was not able to fill satisfactorily the flow channel and exhibited unsatisfactory air bubble removal. Also, the ink of Comparative Example B-5, which contained an anionic surfactant as much as 200 ppm by mass, was not able to fill satisfactorily the flow channel and exhibited unsatisfactory air bubble removal. These results show that when the anionic surfactant content was excessively large or small, the filling and air bubble removal were not satisfied. This suggests that the amount of the anionic surfactant is a factor involved in the surface tension and wettability of the ink. Thus, it has been found that if an anionic surfactant is used to improve the filling property and air bubble removal, a very small appropriate amount of the anionic surfactant should be used within a very narrow range.

Also, the ink of Comparative Example B-4, which contained a nonionic surfactant as little as 0.01% by mass, and the ink of Comparative Example B-6, which contained 5% by mass of a nonionic surfactant, each exhibited unsatisfactory ejection stability. This suggests that there is an appropriate content of the nonionic surfactant, which may depend on the compatibility with or the proportion to the anionic surfactant.

The invention is not limited to the above-described embodiments, and various modifications may be made. For example, the invention includes substantially the same form as the disclosed embodiments (for example, a form including the same function and method and producing the same result, or a form having the same purpose and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

The entire disclosure of Japanese Patent Application No. 2017-147787, filed Jul. 31, 2017 and 2018-101298, filed May 28, 2018 are expressly incorporated by reference herein.

What is claimed is:

1. An ink jet textile printing ink comprising: a water-soluble dye that is at least one selected from the group consisting of acid dyes, reactive dyes, and direct dyes;
   a nonionic surfactant with a content in the range of 0.05% by mass to 3.0% by mass relative to the total mass of the ink jet textile printing ink; and
   an anionic surfactant with a content in the range of 1 ppm by mass to 100 ppm by mass relative to the total mass of the ink jet textile printing ink,
   wherein the nonionic surfactant is an acetylene glycol-based surfactant.

2. The ink jet textile printing ink according to claim 1, wherein the water-soluble dye is at least one selected from the group consisting of RBk 39, RY 95, RBk 5, ABk 172, AY 79, DB 87, AR 138, and AV 97.

3. The ink jet textile printing ink according to claim 1, wherein the anionic surfactant is an aromatic sulfonic acid having an alkyl group or a salt thereof.

4. The ink jet textile printing ink according to claim 3, wherein the aromatic sulfonic acid or the salt thereof may be one selected from the group consisting of dodecyl diphenyl ether disulfonic acid and salts thereof and dodecylbenzene sulfonic acid and salts thereof.

5. An ink jet textile printing ink set comprising at least two inks including the ink jet textile printing ink as set forth in claim 1.

6. An ink jet textile printing ink set comprising at least two inks including the ink jet textile printing ink as set forth in claim 2.

7. An ink jet textile printing ink set comprising at least two inks including the ink jet textile printing ink as set forth in claim 3.

8. An ink jet textile printing ink set comprising at least two inks including the ink jet textile printing ink as set forth in claim 4.

* * * * *